United States Patent [19]

Chow

[11] Patent Number: 4,876,624
[45] Date of Patent: Oct. 24, 1989

[54] APPARATUS FOR DETECTING UNSYMMETRICAL BIPOLAR WAVEFORMS

[75] Inventor: Kung C. Chow, Coral Springs, Fla.

[73] Assignee: Westinghouse Electric Corp., Pittsburgh, Pa.

[21] Appl. No.: 220,706

[22] Filed: Jul. 13, 1988

[51] Int. Cl.$^4$ ............................................. H02H 3/26
[52] U.S. Cl. ........................................ 361/87; 361/20; 361/77
[58] Field of Search ........................ 361/20, 21, 77, 79, 361/82, 85, 86, 87

[56] References Cited

U.S. PATENT DOCUMENTS

| 4,470,091 | 9/1984 | Sun et al. | 361/20 |
| 4,589,048 | 5/1986 | Takata | 361/20 |
| 4,635,157 | 1/1987 | Ebisaka | 361/20 |
| 4,698,718 | 10/1987 | Chow et al. | 361/77 |
| 4,763,014 | 8/1988 | Model et al. | 361/84 |

Primary Examiner—A. D. Pellinen
Assistant Examiner—Jeffrey A. Gaffin
Attorney, Agent, or Firm—B. R. Studebaker

[57] ABSTRACT

A predetermined unsymmetry of a bipolar waveform is detected by apparatus which includes a circuit which generates a pulse for each zero crossing of the waveform. Each zero crossing pulse triggers a first retriggerable one-shot for a first interval $T_1$. Timing out of the first one-shot triggers a second retriggerable one-shot for a second interval $T_2$. If both the first and second one-shots have timed out a third one-shot is triggered for a third interval $T_3$. The intervals are selected such that twice $T_1$ plus $T_2$ is equal to the period of one cycle of the bipolar waveform so that triggering of the third one-shot is an indication of a predetermined unsymmetry determined by relative values of $T_1$ and $T_2$ of the bipolar waveform. $T_3$ is selected such that two symmetrical cycles of the bipolar waveform are required to clear the unsymmetry indication. The apparatus is applied to blocking a false trip signal from a reverse current relay in response to the in-rush current when a transformer is energized with little or no load.

12 Claims, 5 Drawing Sheets

APPARATUS FOR DETECTING UNSYMMETRICAL BIPOLAR WAVEFORMS

BACKGROUND OF THE INVENTION

1. Field of the Invention

This invention relates to apparatus for detecting unsymmetrical bipolar waveforms such as transformer in-rush currents and has particular application to preventing false trips in electric power transmission system protective relays.

2. Background Information

When a transformer in an electric power transmission system is energized with little or no load, unsymmetrical in-rush current which lasts for several minutes is produced. Such transient currents can have adverse effects on certain protective relays. For instance, they can cause false tripping of the reverse current relay described in U.S. Pat. No. 4,698,718. This relay monitors the phase relation between the current and voltage in a transmission line and opens a circuit breaker if this phase relationship indicates a reverse power condition. The reverse power condition is indicated by the presence of a negative dc component in the product of a signal representative of the current and a phase shifted signal representative of voltage. The pulses generated by transformer in-rush current produce a dc component in this product signal which is sufficient to trip the breaker.

It is an object of the present invention to provide apparatus for detecting unsymmetrical bipolar waveforms.

It is another object of the invention to provide such apparatus which acts rapidly to detect unsymmetry within one cycle of the waveform.

It is yet another object of the invention to provide such apparatus which can be easily adjusted to detect varying degrees of unsymmetry.

It is still another object of the invention to provide such apparatus which maintains an indication of unsymmetry until symmetry of the waveform is firmly reestablished.

It is also an object of the invention to provide apparatus as described in the previous objects which is adaptable for use in detecting unsymmetry in the waveforms of electric transmission lines before the unsymmetry causes false operation of a protective relay.

SUMMARY OF THE INVENTION

These and other objects are realized by the invention which comprises apparatus for detecting unsymmetric bipolar waveforms of a predetermined frequency including means to generate a pulse at each zero crossing of the bipolar waveform. First circuit means, such as a retriggerable one-shot, generates a first signal of a first value for a first preselected interval in response to a pulse from the pulse generating means, otherwise the first signal has a second value. A second circuit means, such as another retriggerable one-shot, generates a second signal of a first value for a second preselected interval in response to the first signal going from the second to first value, otherwise the second signal has a second value. The first and second intervals are selected such that the first and second signals have said second values simultaneously only when the bipolar waveform has a preselected unsymmetry. Preferably, these intervals are selected such that twice the first interval plus the second interval is equal to the period of one cycle of the bipolar waveform. Third circuit means responsive to the first and second signals both having the respective second value generates an output signal indicative of the preselected unsymmetry of the bipolar waveform.

Preferably, delay means delays application of the first or second signal to the third circuit means for a delay interval equal at least to the time required for the second circuit means to change the value of the second signal in response to the first signal going from the first to the second value.

In addition, the third circuit means can include means which maintains the output signal indicative of the predetermined unsymmetry of the bipolar waveform for a third interval. This interval is of such a duration that the signal indicative of unsymmetry continues to be generated until the waveform again becomes symmetrical for the duration of the third interval. In the exemplary apparatus, this third interval is of a duration of slightly more than two cycles of the bipolar waveform so that two cycles of symmetrical waveform are required to clear the signal indicative of unsymmetry.

Preferably, the third circuit means includes means, such as, for example, an AND gate or a flip-flop, which generates a third signal having a first value only when the first and second signals each have the respective second value and a fifth circuit means, such as a retriggerable one-shot, which is responsive to the third signal going to the first value to generate the output signal indicative of the preselected unsymmetry for the third interval.

The invention is useful for instance in detecting the unsymmetrical in-rush current produced when a transformer is energized with little or no load. It is particularly useful in preventing false trips in a reverse current relay which mistakes in-rush current for a reverse power condition and attempts to reopen the breaker which initiated the in-rush current by energizing a transformer in an electric power transmission line with little or no load.

The time intervals can be easily reset to provide detection of any derived percentage of unsymmetry.

BRIEF DESCRIPTION OF THE DRAWINGS

A full understanding of the invention can be gained from the following description of the preferred embodiment when read in conjunction with the accompanying drawings in which:

FIGS. 4 *a–d* are waveform diagrams illustrating the operation of the invention in response to a symmetrical input waveform to the reverse current relay of FIG. 2.

FIGS. 5 *a–d* are waveform diagrams illustrating operation of the invention in response to a marginally unsymmetrical input waveform to the reverse current relay of FIG. 2.

FIGS. 6 *a–d* are waveform diagrams illustrating operation of the invention in response to an unsymmetrical input waveform to the reverse power relay of FIG. 2.

DESCRIPTION OF THE PREFERRED EMBODIMENTS

The invention for detecting unsymmetrical waveforms will be described as applied to detecting transformer in-rush current in an electric power transmission system and preventing false tripping of a reverse current relay used to protect the generators in such a system. However, it will be appreciated that the invention has other applications where it is desirable to detect unsymmetrical waveforms.

Figure 1:
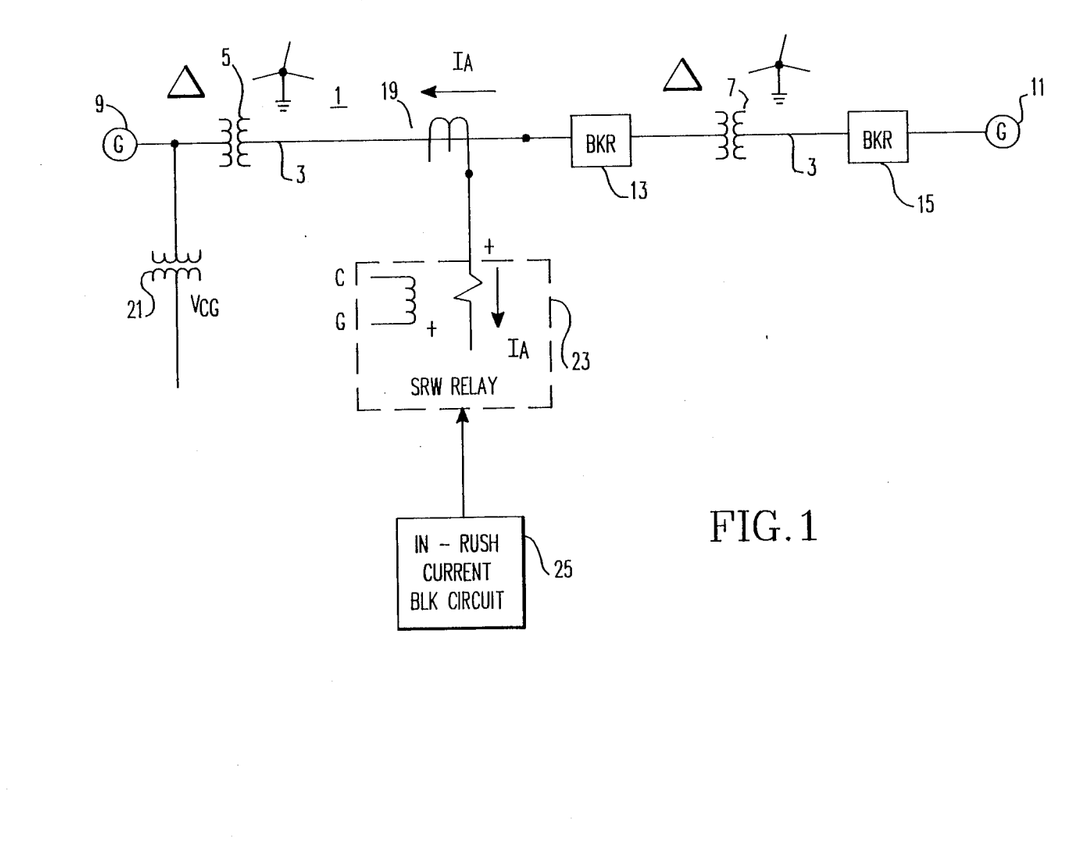
FIG. 1 is a schematic diagram of an electric power transmission system protected by a reverse current relay incorporating the invention.

The electric power transmission system 1 of FIG. 1 includes a three-phase transmission line 3 coupled through Delta-Wye connected transformers 5 and 7 to three-phase generators 9 and 11 respectively. Circuit breakers 13 and 15 can be tripped to isolate certain parts of the transmission line 3. A current transformer 19 coupled to one phase of the transmission line 3 monitors that phase current. A potential transformer 21 monitors the voltage across another phase of the transmission line and ground close to the generator 9.

The current and voltage signals monitored by the current and potential transformers 19 and 21 are utilized by a reverse current relay 23 to detect reverse power conditions which could cause motoring of the generator 9. Upon detection of power flow in the reverse direction, the reverse current relay 23 trips the breaker 13 to disconnect the generator 9 from the transmission line 3.

A suitable reverse power relay is disclosed in U.S. Pat. No. 4,698,718. This relay provides very sensitive detection of a reverse power condition. However it can generate a false trip signal in response to an unsymmetrical waveform on the power line 3. This can occur, for instance, if a breaker is closed on little or no load. Thus, if the breaker 13 is closed while breaker 15 is open, the in-rush current to the transformer 7 is a train of unidirectional pulses of decaying amplitude. This train of pulses generates a false trip by the reverse current relay 23. The in-rush current block circuit 25 of this invention detects this condition and prevents the breaker 13 from reopening.

Figure 2:
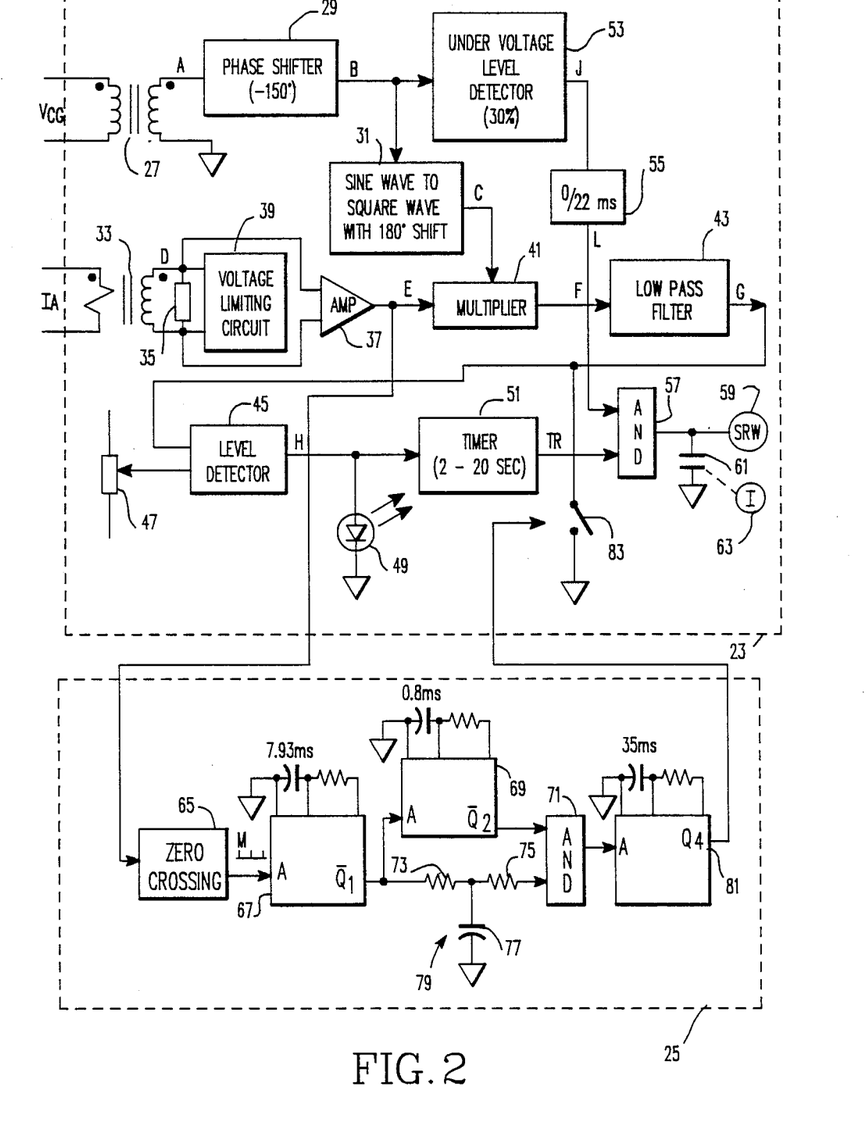
FIG. 2 is a schematic diagram in block form of the reverse current relay of FIG. 1 incorporating the invention.

FIG. 2 illustrates schematically the reverse current relay 23 and the in-rush current block circuit 25 and their interconnections. Basically, the reverse current relay 23 is a single phase directional relay which senses the current in one phase of the transmission line and the voltage between that phase and another phase, or another phase and ground, and performs the computation $|I| \times \cos(\theta - 30°)$. Where I is the selected phase current, for example $I_a$, and $\theta$ is the angle by which this current leads the voltage, for example $V_{cg}$. A trip signal is generated if the value of the computation is positive; that is: $\theta$ is between +120 degrees and −60 degrees.

The potential signal proportional to the voltage between phase c and ground of the transmission line 3 produced by potential transformer 21 is applied to an isolation transformer 27. One side of the secondary coil of transformer 27 is grounded and the other is connected to a phase shifter circuit 29 which in the exemplary system shifts the potential signal A produced by the secondary of transformer 27 by 150° degrees in the lagging direction. The phase shifted potential signal B, which is essentially a sine wave, is applied to a circuit 31 which converts it to a square wave C with an inversion in polarity. This effectively produces a square wave which is phase shifted 30° in the leading direction from the potential signal $V_{cg}$.

The current signal $I_a$ is applied to an auxiliary current transformer 33 in the relay 23. A resistor 35 across the secondary of transformer 33 converts this current signal to a voltage signal D which is applied to a conventional differential amplifier 37 to generate a current representative signal E. In order to prevent saturation of current transformer 33 and to protect the input stage of amplifier 37, a voltage limiting circuit 39 is connected across the resistor 35.

The two signals C and E are multiplied in a multiplier circuit 41 to produce a product signal F having a zero frequency or dc component and a multiplicity of other harmonically related components. The multiplication operation of voltage representative signal C on current representative signal E is such that the current representative signal passes with no change in polarity when the essentially square waveform C is in a first digital state and passes with inverted polarity when waveform C is in a second digital state. Thus, with a zero degree phase angle $\phi$, the current representative signal E is full-wave rectified by the signal states of signal C and the product signal therefore has a zero dc component. Changes in the phase angle $\phi$ produce a product signal with dc components which are either positive or negative and of varying amplitude. Reverse power is indicated when the phase angle $\phi$ is between +90 degrees and +270 degrees (−90 degrees) where the dc component of the multiplication product signal is negative.

The product signal F is passed through a low-pass filter and inverter circuit 43 to extract substantially a dc component signal G which is indicative of the real power of the generator 9. The extracted dc component signal G is applied to a level detector 45 where it is compared with a pickup setting generated by potentiometer 47 representing the threshold for generator motoring. If the dc component signal exceeds the pickup setting, the level detector circuit 45 generates a signal H which turns on a light emitting diode 49 to signal this condition. A timer 51 determines the sustaining time of the signal H. In the exemplary relay, this sustaining time is 2 to 20 seconds. If the signal H persists for a time exceeding this sustaining time, a trip signal TR is generated.

The relay 23 may also include undervoltage detection circuitry 53 to inhibit the generated trip signal TR from signaling peripheral anti-motoring apparatus. The undervoltage circuit 53 normally generates a signal J having a digital value of ONE. However, when the amplitude of phase shifted signal B is below a selected percentage, such as, for example, 30 percent of a reference value, the signal J goes low. The signal J is applied to a delay circuit 55 which in the exemplary relay picks up immediately but has a 22 second delay in drop out. Thus a signal L is generated by delay circuit 55 which persists for the duration of the J signal and for 22 seconds thereafter. This signal L is applied to an AND gate 57 together with the trip signal TR. When the signal L is high, the trip signal TR is passed by AND gate 57 to the coil of the relay 59. The relay 59 is sealed in by a set of make contacts 61 which also activate a trip indicator 63 which activates the circuits to trip breaker 13. If an undervoltage condition exists for at least the time interval set by delay circuit 55, signal L goes low, and the trip signal TR is inhibited from passing through AND gate 57.

Figure 3:
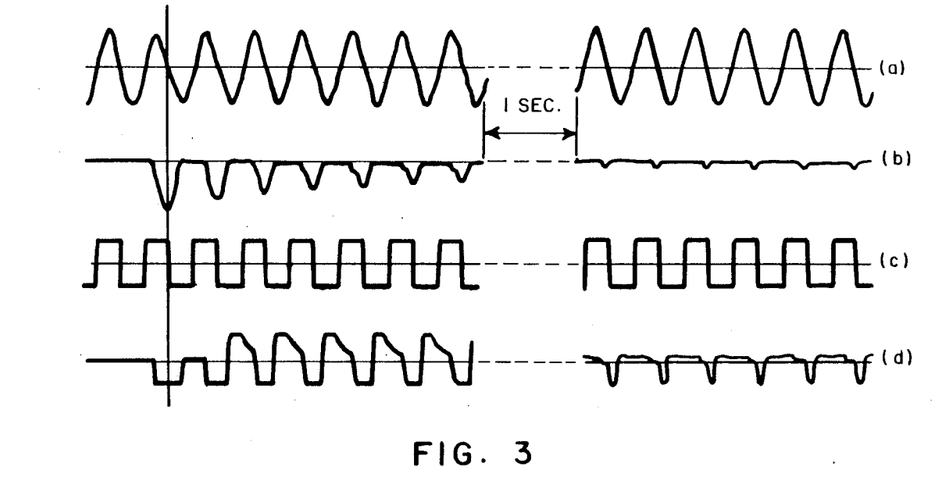
FIG. 3 is a waveform diagram illustrating the operation of the reverse current relay of FIG. 2 in response to transformer in-rush current.

Operation of the relay 23 in response to an unsymmetrical waveform such as the transformer in-rush current resulting from closing breaker 13 while breaker 15 is open is illustrated by the waveforms of FIG. 3. Trace (a) of FIG. 3 represents the sinusoidal voltage $V_{cg}$ supplied to transmission line 3 by the generator 9. Trace (b) is a train of decaying unidirectional phase a transformer in-rush current pulses. After several seconds, this train of pulses decays to a continuous stream of uniform pulses of small amplitude. Trace (c) in FIG. 3 illustrates the phase shifted and inverted potential signal C. Trace (d) is the current signal E which is multiplied by the potential signal C. Signal F, the product of E and C has a negative dc component extracted as signal G which is interpreted by the level detector circuit 45 as a reverse power condition, thereby generating a trip signal TR.

The in-rush current block circuit 25 distinguishes this condition from a reverse power condition by recognizing the unsymmetry of the in-rush current waveform. The unsymmetry that is detected is not the difference in amplitude of positive and negative half cycles, but the difference in the duration of the positive and negative half cycles. Thus, returning to FIG. 2, the in-rush current blocking circuit 25 includes a zero crossing detector circuit 65 which generates a series of narrow pulses M, one for each time the input current waveform E crosses the zero volt line. This series of zero crossing pulses is applied to the input of a first retriggerable one-shot circuit 67 having a time delay $T_1$. In the exemplary circuit $T_1$ is 7.93 ms. The signal $\overline{Q}_1$ product by one-shot 67 is applied to the input of a second retriggerable one-shot circuit 69 having a time delay $T_2$ which in the exemplary system is set for 0.8 ms. The inverted output $\overline{Q}_2$ of circuit 69 goes from high to low in response to the switching of $\overline{Q}_1$ from low to high, and remains low for the delay interval $T_2$. The signals $\overline{Q}_1$ and $\overline{Q}_2$ are both applied to an AND gate 71. Resistors 73 and 75 and capacitor 77 form a delay circuit 79 which provides a slight time delay in applying $\overline{Q}_1$ to AND gate 71 until $\overline{Q}_2$ has stabilized at its new value. In the exemplary system, this delay is about 50 microseconds. The output of AND gate 71 is applied to another retriggerable one shot 81 which generates a logical ONE on output $Q_4$ for an interval $T_3$ in response to a logical one from the AND gate 71. In the exemplary embodiment, $T_3$ is set for slightly more than twice the period of the sinusoidal signal or for about 35 milliseconds for a 60 hertz waveform. The signal $\overline{Q}_4$, when high, operates a switch 83 to ground the signal G, and thus prevent the generation of a trip signal TR.

Figure 4:
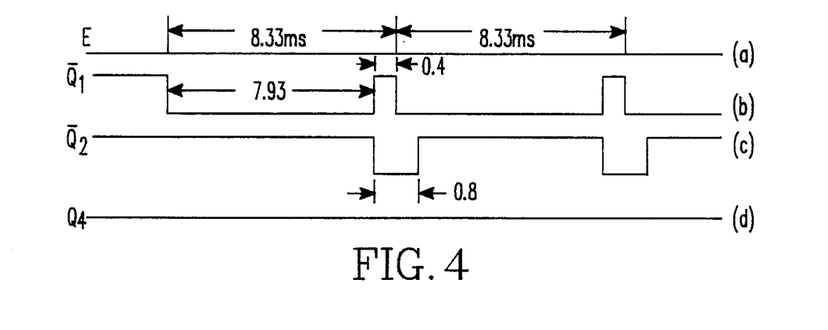

Operation of the in-rush current block circuit 25 can best be understood by several examples graphically depicted by the waveforms of FIGS. 4a–6d. FIG. 4 illustrates operation of the circuit 25 in response to symmetrical 60 hertz input waveforms. As indicated by FIG. 4a, pulses are generated by the zero crossing detector circuit 65 at equally spaced intervals of 8.33 ms. The first pulse triggers one-shot 67 causing the signal $\overline{Q}_1$ to go low. At the end of the interval $T_1$, which equals 7.93 msecs in the example, $\overline{Q}_1$ returns to its high level triggering one shot 69 which goes low for 0.8 ms as shown in FIG. 4c. The time delay circuit 79 maintains the logical ZERO from $\overline{Q}_1$ on AND gate 71 until $\overline{Q}_2$ has switched to the low state. Before the interval $T_2$ has expired, a second pulse is generated by the zero crossing circuit 65 as indicated in FIG. 4a causing $\overline{Q}_1$ to go low again before the one-shot 69 times out and returns $\overline{Q}_2$ to its high value. Thus, $\overline{Q}_1$ and $\overline{Q}_2$ are never high at the same time and the output of AND 71 stays low maintaining $Q_4$ at the logical ZERO value as shown in FIG. 4d. As a result, the switch 83 remains open and the reverse current relay 23 operates normally.

For an example of a marginally unsymmetrical waveform, assume that the positive half cycle has a duration of 8.0 ms and that the negative half cycle lasts for 8.66 ms as illustrated in FIG. 5a. The first zero crossing pulse triggers one shot 67 causing $\overline{Q}_1$ to go to the logic ZERO state as shown in FIG. 5b. After 7.93, $\overline{Q}_1$ returns to the logic ONE state triggering $\overline{Q}_2$ to the low state as shown in FIG. 5c. After an additional 0.07 milliseconds, the second zero crossing pulse returns $\overline{Q}_1$ to logic ZERO before one-shot 69 times out and $\overline{Q}_2$ returns to logic ONE. Thus, as in the case of the symmetrical waveform, $Q_4$ remains logic ZERO as shown in FIG. 5d, to maintain the switch 83 open and the reverse current relay 23 operates normally.

Assume now, that the input waveforms are unsymmetrical with 7.9 ms on the positive side and 8.76 milliseconds on the negative side as shown in FIG. 6a. The first zero crossing pulse triggers one-shot 67 causing $\overline{Q}_1$ to go low and starting the 7.93 ms time delay $T_1$. However, after 7.9 ms, and before $T_1$ has expired, the second zero crossing pulse retriggers one-shot 67 resetting the delay $T_1$ and maintaining $\overline{Q}_1$ a logic ZERO for another 7.93 ms. At the end of this reinstituted 7.93 ms interval, and hence after a total of 15.83 ms, $\overline{Q}_1$ goes high again and remains in that state for another 0.83 ms until the next zero crossing pulse causes it to go low again. $\overline{Q}_1$ returns to the logic ONE state going high after 15.83 ms triggers one-shot 69 causing $\overline{Q}_2$ to go low. After 0.8 ms when $T_2$ expires, $\overline{Q}_2$ returns to the logic ONE state. Hence both $\overline{Q}_1$ and $\overline{Q}_2$ are in the logic ONE state, AND gate 71 generates a 0.03 ms pulse which triggers one-shot 81 to set $Q_4$ to the logic ONE state. This closes switch 83 to block signal G from passing through to the level detector 45. Thus, the trip relay 59 is disabled. As long as the input waveform is unsymmetrical, switch 83 remains closed. Since one-shot 81 is set for a time delay $T_3$ of 35 ms, $Q_4$ will be reset to logic ZERO when two consecutive symmetrical cycles (33.32 ms) are detected.

The relationship between the input waveform period $T_0$ and the two time delays $T_1$ and $T_2$ can be expressed as follows:

$$T_0 - 2T_1 = T_2 \qquad \text{Eq. 1}$$

the percentage of unsymmetry (y%) can be defined as:

$$y\% = 1 - \left(\frac{T_1}{T_0/2}\right)100 \qquad \text{Eq. 2}$$

Thus, for a 60 hertz input waveform with a $T_0$ of 16.666 ms, Equation 2 can be solved to determine that for 5% unsymmetry $T_1$ equals 7.91 ms. Equation 1 is then solved to determine that $T_2$ is 0.84. Similarly, for 10% unsymmetry, $T_1$ equals 7.5 ms and $T_2$ equals 1.66 ms.

Figure 5:
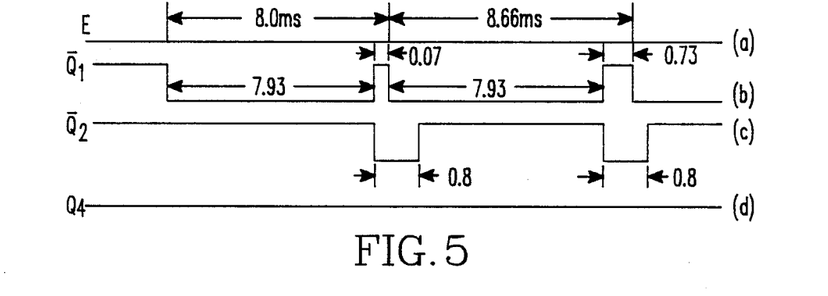
Figure 6:
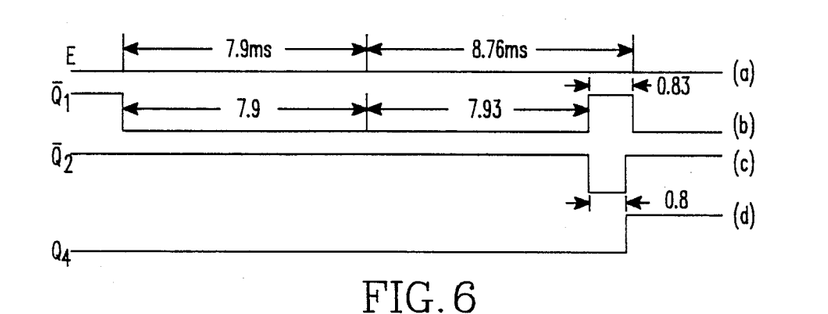
Figure 7:
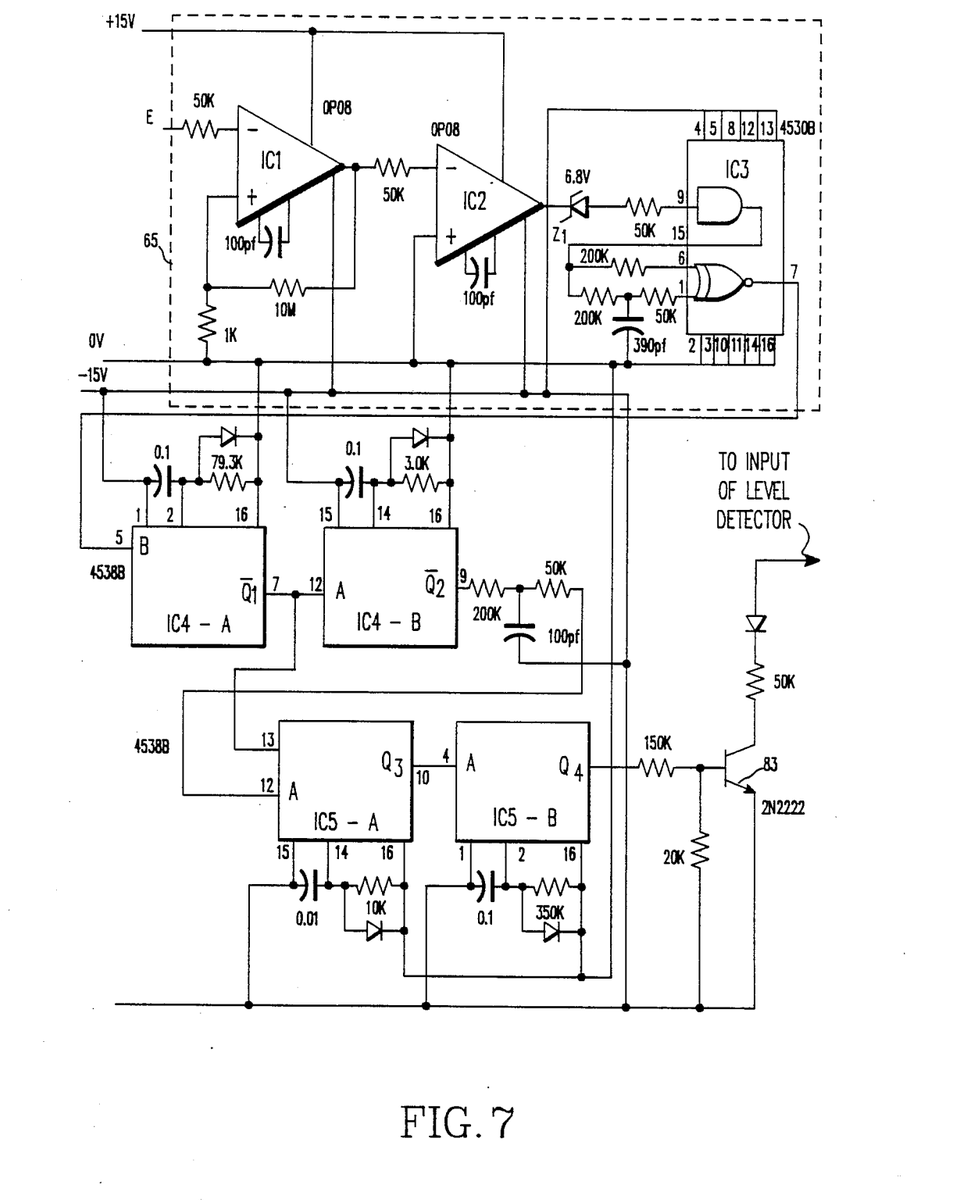
FIG. 7 is a schematic diagram of an exemplary circuit which detects unsymmetrical waveforms in accordance with the teachings of the invention.

FIG. 5 illustrates an exemplary circuit implementation of the invention. The zero crossing circuit 65 comprises a pair of serially connected high gain operational amplifiers IC1 and IC2 which shape the input (+)15 and (−)15 volt square to obtain a waveform with sharp rising and falling edges. The zero crossing circuit also includes a 6.8 volt zener diode Z1 which is used as a level shifter to shift the logic level of the square wave output of IC2 from +15 to −15 volts to 0 to −15 volts with the zero crossing points occurring at approximate −7 volts. This 0 to −15 volt logic signal is applied to an AND gate in IC3 within a 4530B integrated circuit which is also a part of the zero crossing circuit 65. The inverter gate in IC3 makes the edges of the waveform sharper. The output of IC3 is applied to one input of an exclusive NOR circuit XNOR in the integrated circuit 4530B directly through an input resistor, and to the second input through a resistor capacitor time delay circuit. The exclusive NOR circuit generates a high voltage output signal when the two inputs are the same and a low voltage output signal when they are different. Thus, when the output of IC3 switches with a zero crossing the signal on pin 6 of the exclusive NOR changes immediately to cause the output to go low. Upon the expiration of the time delay, the signal on pin 1 also changes and the output of the exclusive NOR returns to high voltage. Thus, the exclusive NOR generates a negative pulse with each zero crossing having a duration determined by the time delay in the input applied to pin 1. In the exemplary system, this time delay, and therefore the duration of the zero crossing pulses is about 78 microseconds.

The negative zero crossing pulses produced by the exclusive NOR circuit are applied to the B input of the first IC4-A causing the $\overline{Q}_1$ output to go low for the interval $T_1$, which in the example is 7.93 ms. When $\overline{Q}_1$ returns to the high logic level, the leading edge of the pulse triggers the second one-shot IC4-B to cause $\overline{Q}_2$ to go low. $\overline{Q}_1$ and $\overline{Q}_2$ are applied to a flip-flop IC5-A which performs the same function as the AND gate 71 in FIG. 2. $\overline{Q}_1$ is applied to the reset input of IC5-A and $\overline{Q}_2$ is applied to the set input through a 20 microsecond RC time delay circuit. $\overline{Q}_1$ must be high when $\overline{Q}_2$ goes high in order for the output $Q_3$ to go high. This will only occur if the waveform $I_a$ is so unsymmetrical that IC4-B times out before another zero crossing pulses causes $\overline{Q}_1$ to go low again. The $Q_3$ pulse when generated triggers IC5-B to cause $Q_4$ to go high for 35 seconds. With $Q_4$ at logic ONE, the switch 83, which in the example is 2N2222 transistor, is closed (transistor 83 is turned on) to drive the input to the level detector low and block passage of the dc component signal G from the low pass filter.

As can be appreciated from the above, the invention provides a simple effective means for determining unsymmetry in a bipolar waveform which is particularly effective for use in blocking false trips in protective relays for electric power transmission systems. The percentage of unsymmetry detected is easily changed simply by adjusting the time delays $T_1$ and $T_2$ of retriggerable timers.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for detecting a preselected unsymmetry bipolar waveforms of a predetermined frequency comprising:
    means generating a pulse at each zero crossing of the bipolar waveform;
    first circuit means generating a first signal of a first value for a first preselected interval in response to a pulse from the pulse generating means and generating a first signal having a second value otherwise;
    second circuit means generating a second signal of a first value for a second preselected interval in response to the first signal going from the first value to the second value and having a second value otherwise, said first and second intervals being selected such that first and second signals have said second values simultaneously only when said bipolar waveform has at least said preselected unsymmetry; and
    third circuit means responsive to the simultaneous presence of said first signal of the second value and the second signal of the second value to generate an output signal indicative of said preselected unsymmetry of the bipolar waveform.

2. The apparatus of claim 1 including delay means delaying application of one of said first and second signals to the third circuit means for a delay interval equal at least to the time required for said second circuit means to change the value of said second signal in response to said first signal going from said first to second value.

3. The apparatus of claim 1 wherein said first and second intervals are selected such that twice the first interval plus the second interval is equal to the period of one cycle of the bipolar waveform.

4. The apparatus of claim 1 wherein said third circuit means includes means maintaining for a third interval said output signal indicative of said preselected unsymmetry of the bipolar waveform in response to the simultaneous application to said third circuit means of first and second signals of said second values.

5. The apparatus of claim 4 wherein said third interval is about the duration of two periods of said bipolar waveform, such that said signal indicative of the predetermined unsymmetry of the bipolar waveform is maintained until two symmetrical cycles of the bipolar waveform have been detected.

6. The apparatus of claim 4 wherein said third circuit means includes fourth circuit means generating a third signal having a first value only when said first and second signals each have said second values and having a second value otherwise, and fifth circuit means responsive to said third signal going to said first value to generate said output signal indicative of said preselected unsymmetry for said third interval.

7. The apparatus of claim 6 wherein said third interval is equal to about the duration of two cycles of said bipolar waveform.

8. The apparatus of claim 6 including delay means delaying the application of one of said first and second signals to said fourth circuit means for a delay interval equal at least to the time required for said second circuit means to change the value of said second signal in response to said first signal going from said first to second value.

9. The apparatus of claim 1 adapted for detecting transformer in-rush current resulting from energization with a sinusoidal voltage of a main transformer with little load, said apparatus including: current transformer means generating a reference current proportional to current through the main transformer and wherein said pulse generating means generates a pulse at each zero crossing of said reference current such that said output signal indicative of said preselected unsymmetry is generated when said transformer in-rush current is more unsymmetrical than said preselected unsymmetry.

10. The apparatus of claim 9 including a generator applying said sinusoidal voltage to said main transformer, potential transformer means generating a reference voltage proportional to said sinusoidal voltage, a reverse current relay responsive to said reference current and voltage to generate a trip signal when the real power of the generator is negative, and means responsive to said output signal indicative of a preselected unsymmetry of the main transformer current to block said trip signal.

11. The apparatus of claim 10 wherein said third interval is about equal in duration to two cycles of the sinusoidal voltage such that said transformer current must have two symmetrical cycles before said trip signal is unblocked.

12. In combination:
a generator generating a sinusoidal voltage;
a transformer having a primary winding connected to the generator and a secondary winding;
a transmission line connected to the secondary winding of the transformer;
a circuit breaker connecting the transmission line to the secondary winding of said transformer and operative to disconnect said transmission line from the transformer in response to a trip signal;
a reverse current relay responsive to the current and voltage delivered to the primary winding of the transformer by the generator generating a trip signal to operate said circuit breaker to disconnect the transformer from the generator when real power of the generator is negative; and
a transformer in-rush current block circuit comprising;
means generating a pulse at each zero crossing of the current delivered by the generator to the primary winding of the transformer;
means generating a first signal having a first value for a first interval in response to each pulse generated by the pulse generating means and having a second value otherwise, generating a second signal having a first value for a second interval in response to the first signal going from said second value to first value and having a second value otherwise, and generating an output signal for a third interval in response to a simultaneous occurrence of said first and second signals of the second values, said first and second intervals being selected such that said first and second signals have said second values simultaneously only during a time that said transformer in-rush current has at least predetermined unsymmetry, and;
means responsive to said output signal for blocking said trip signal.

* * * * *